Jan. 12, 1965
P. H. KNOTT
3,164,923
CHANGEABLE LIGHT REFLECTIVE DEVICES INCLUDING ANIMATED
TOYS AND DECORATIVE ORNAMENTS
Filed Dec. 11, 1962
4 Sheets-Sheet 2
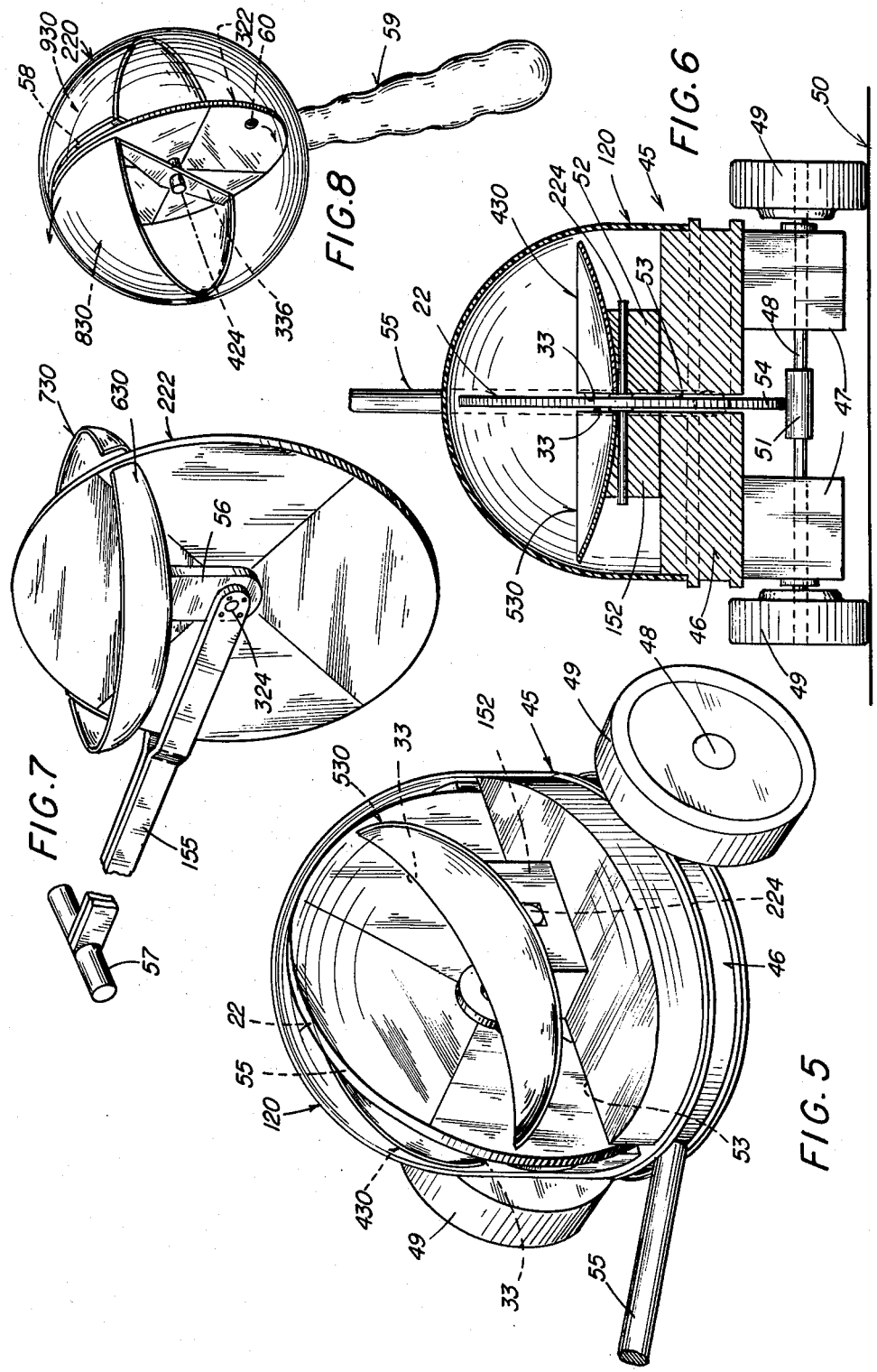

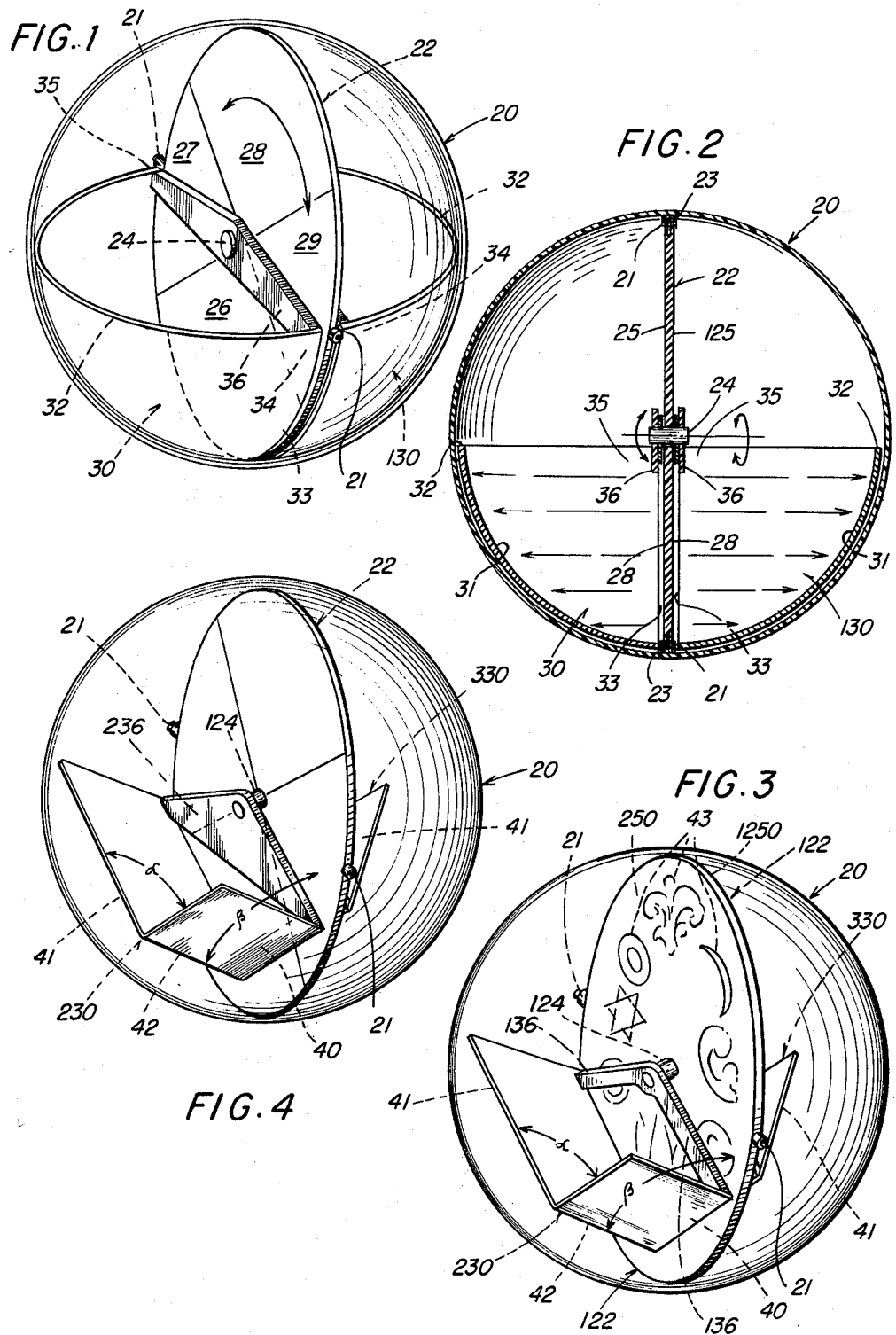

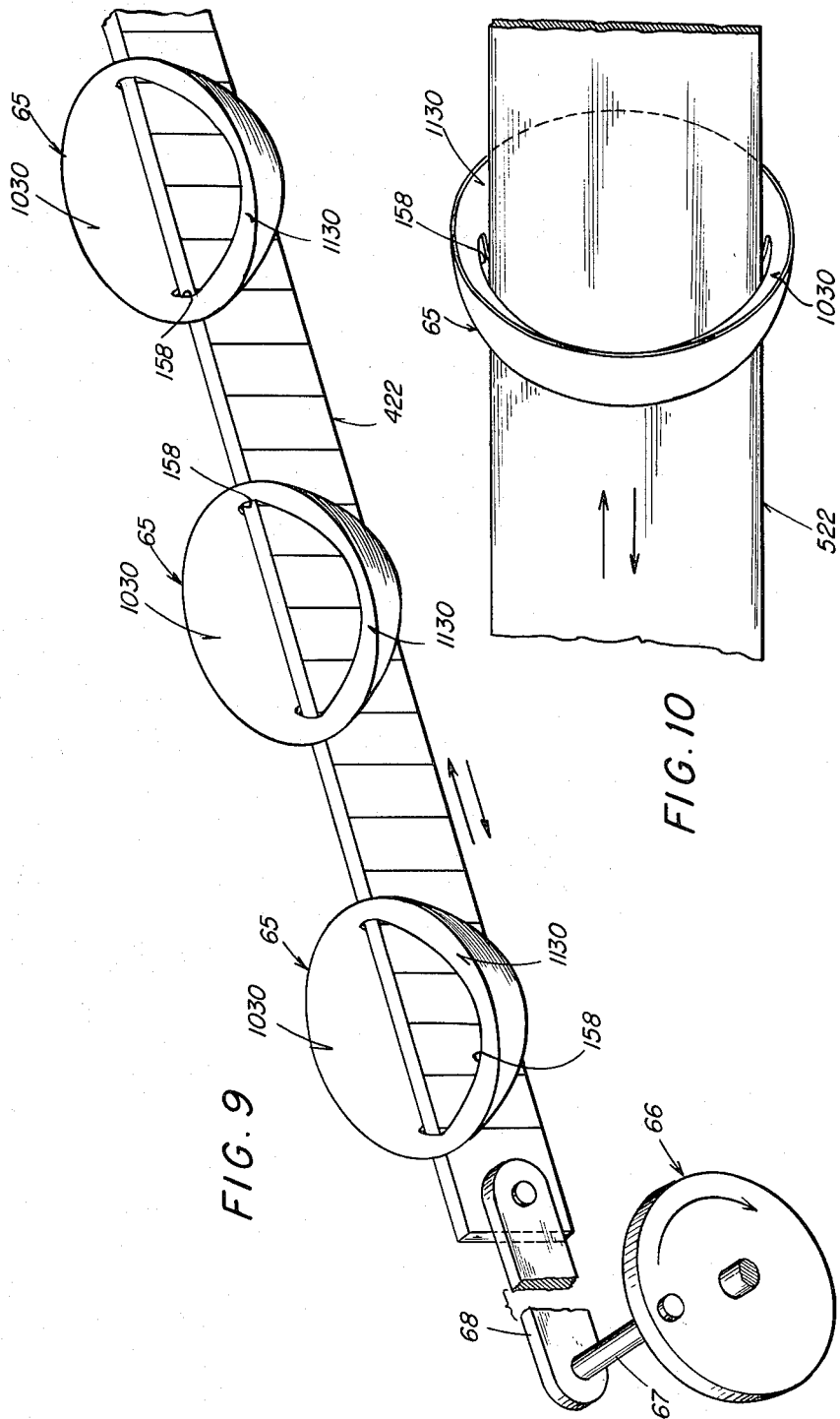

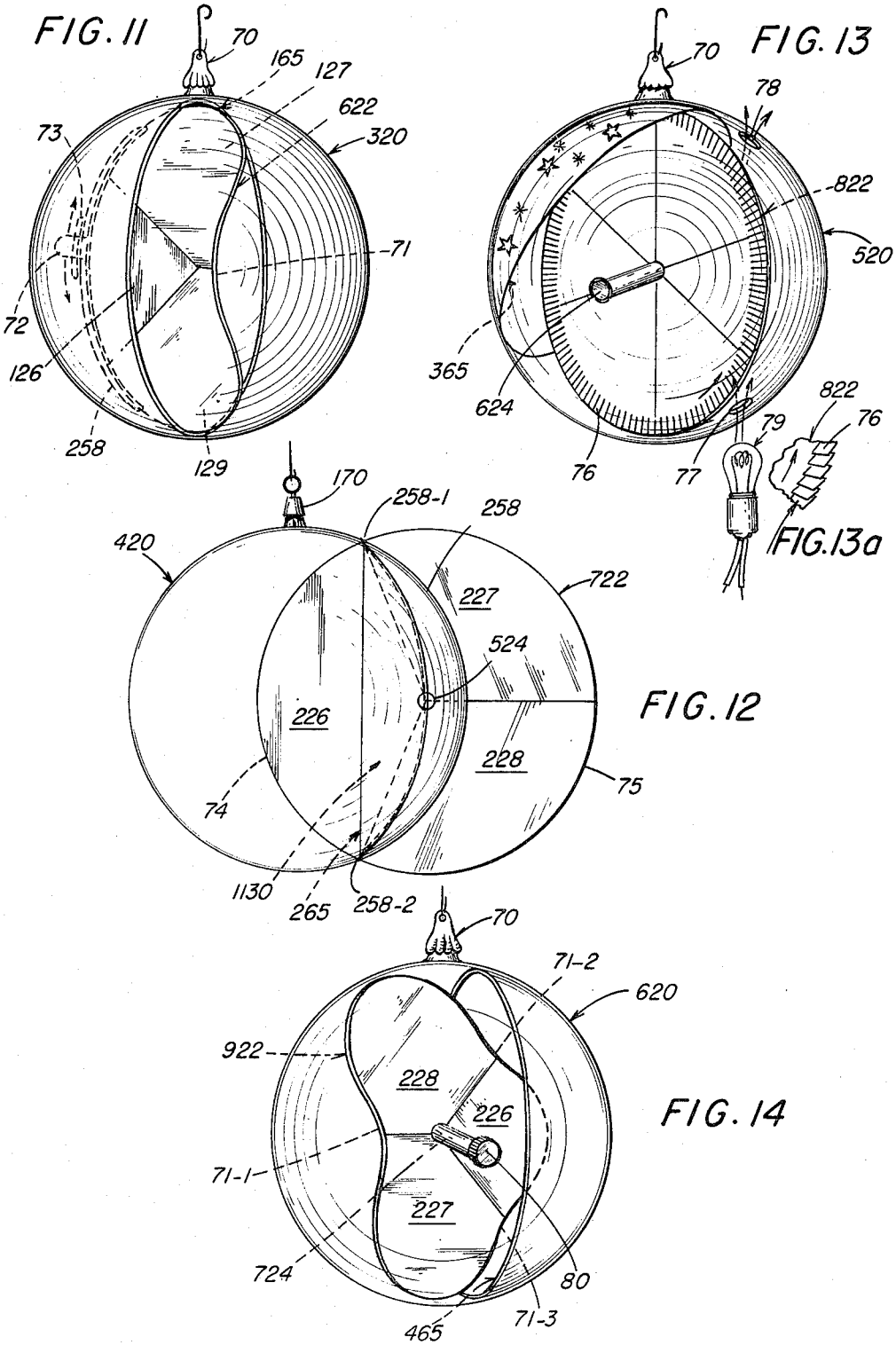

United States Patent Office 3,164,923
Patented Jan. 12, 1965

3,164,923
CHANGEABLE LIGHT REFLECTIVE DEVICES INCLUDING ANIMATED TOYS AND DECORATIVE ORNAMENTS
Philip H. Knott, New York, N.Y.
(202 South St., Apt. A2, Sausalito, Calif.)
Filed Dec. 11, 1962, Ser. No. 243,861
22 Claims. (Cl. 46—49)

The present invention relates to devices which have visual appeal due to abilities thereof to change the colors or patterns of reflected light rays either automatically or in response to manipulations, and which may thus serve in some forms as various types of amusing toys and in other forms as pleasing decorative ornaments, such as tree ornaments.

It is a general object to the invention to provide such devices in practical forms which are economically producible and readily manipulated to effect changes in the colors or patterns of light rays reflected in highly effective manners by angularly related secondary reflective surfaces emanating from primary members associated therewith in relative movable manners.

A more specific object is to provide such devices in forms of toys in each of which is embodied a composite cup-shaped reflective structure that may be caused amusingly to change appearance, either as to colors or as to decorative patterns, or both, by movement relative thereto of a source of colored rays or patterned light beams as a child or other person manually maniplates the toy.

Another object of the invention is to provide ornamental forms of the device which may serve as decorative ornaments for surfaces or as tree ornaments which uniquely embody with angularly related reflective surfaces certain movable members from which colored light rays or patterned beams emanate and strike the reflective surfaces so that the latter desirably will alter the visual aspects when the movable members are manipulated or changed from one relative orientation to another.

A further object of the invention is to provide structural embodiments which may be readily constructed and permit efficient use and operation thereof.

Other objects of the invention will in part be obvious and will in part appear hereinafter.

The objects of the present invention are attained by unique changeable light reflective devices in a plurality of specific forms which may constitute different animated or manually operable products, such as a variety of toys, ornaments, advertising displays, etc. In all forms of the invention each of the devices comprises a composite, cupped, secondary reflective structure into which one looks for visual reflection effects and alterations thereof, such visual reflection effects being magnified in certain embodiments. Such cupped reflective structure includes a pair of obliquely arranged and opposed reflector means, either in the form of abutted or integral sections thereof or separate unitary portions, with each of the pair of reflector means having angularly related reflective areas or surfaces. Since curved surfaces are made up of contiguous minute areas each of which is substantially disposed in a plane angularly related to planes in which are substantially disposed juxtaposed similar minute areas the present composite reflective structure collectively may be a plurality of cooperative concave mirrors, a curvilinearly dished assembly or unit, or flat mirrored sections angularly oriented with respect to each other, and which will embody a pair of obliquely arranged and opposed reflector means each having angularly related reflective surfaces. The individual reflector means of this pair are located on opposite sides of a plane which generally bisects the composite reflective structure, and the latter is provided for a person to observe therein reflected light rays which may be automatically altered or changed at will to give desired different visual reflection effects which are ornamentally pleasing or entertaining. In some forms of the device the pair of opposed reflector means may be defined from each other as separate units by an intervening, relatively narrow space or separating slot, and in other forms they may be merged and defined from each other only by the bisecting plane. In still other forms the pair of opposed reflector means may be separated from each other only in certain sections by a slot of lesser extent beyond the ends of which the pair are connected together or are integral with each other.

Each of these devices also includes, as a primary reflector, a visual change member movably mounted in or along the medial axis or bisecting plane and having at least a zone extending into the cupped secondary reflective structure with side faces of this zone successively bearing visually differing areas to be reflected in the pair of opposed reflector means of the secondary reflector. The movable member may be either a rod or a plate member, and such plate member may be in the form of an elongated strip, or a rotary plate element such as a disk. In some forms of the device such a plate member may have its marginal zone inserted in the slot of any of the previously mentioned slotted forms of the secondary reflector so as to be interposed between the pair of reflector means or units of the latter. If the rotary plate member is a disk it may be mounted in front of the cupped or dished secondary reflector with a sector thereof projecting into the interior of such secondary reflector.

The sector or annular marginal zone of the primary reflector or movable plate member which is interposed between the pair of opposed reflector means of the secondary reflector is provided on opposite sides with successive surface sections having visually differing areas, and of these sections those which are in alignment on opposite sides, i.e., paired by arrangement back to back, may be liked. For example, one of the pair of paired sections may be of substantially similar shape and of one color and the next pair may be like and of another color. As a result of the latter condition light rays incident upon the sections of one of these pairs will cause the color rays which are unabsorbed by the color of the sections facing in opposite directions toward the reflective surfaces of the pair of reflector means of the secondary reflector, when in such reflective position, will be reflected thereto as incident rays to be again reflected by the latter to the eyes of the observer, thereby causing the secondary reflector to appear to be of the color of these primary reflector sections. Upon substituting another differently colored pair of sections of the primary reflector for the former at the reflective position the secondary reflector will appear to have changed color, and the action of substitution can be made gradual to make the color change perceptively progressive. Such sections of the primary reflector may be patterned or bear ornamentally shaped designs, either alone or supplemental to the colors, reflections of which may be observed in the secondary reflector as visually pleasing effects.

The devices also include means to manipulate the primary reflectors relative to the secondary reflectors thereof to effect the visual change effects. Such manipulative means may be manually engageable portions of or projections on the movable plate members for hand translation, or power driven means to reciprocate strip forms or to rotate disk forms of the primary reflector. Power drive is particularly useful in forms of the device employed as advertising displays. If the primary reflector is in the form of a freely rotating plate member weighting one side thereof will cause pendulous swinging relative to structure supporting the secondary reflector if this supporting structure is swung intentionally, or the device is suspended thereby and sways naturally, as a result of the nature of its support or suspension and attendant environmental conditions.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description reference taken in connection with the accompanying drawings, in which:

FIG. 1 is an elevational view of an amusement or toy embodiment of the present invention in the form of a free rolling ball;

FIG. 2 is a transverse section of the ball of FIG. 1, taken substantially along a diametric plane;

FIG. 3 is an elevational view similar to FIG. 1 of a modified form of the toy ball illustrated in FIGS. 1 and 2;

FIG. 4 is an elevational view of a variation of the toy ball shown in FIG. 3;

FIG. 5 is a perspective view of an embodiment of the device of the present invention in a small vehicle structure adapted to be employed as a wheeled toy, with a part of the handle broken away;

FIG. 6 is a transverse sectional view of the vehicle structure shown in FIG. 5, and with certain parts shown in elevation;

FIG. 7 is a perspective view, with parts broken away, of a simplified form of the vehicle structure embodiment illustrated in FIGS. 5 and 6;

FIG. 8 is a perspective view of a further modified form of the device as embodied in a child's hand toy of the "rattle" type;

FIG. 9 is a perspective view of an embodiment of the device in the form of an ornamental structure or animated display, with parts broken away;

FIG. 10 is a perspective view of a portion of a device of the type depicted in FIG. 9 with parts thereof modified;

FIG. 11 is an elevational view of a further embodiment of the device in the form of a suspendable ornament, such as of the type hung upon trees for decorative purposes;

FIG. 12 is a side elevational view of a modified form of the ornament depicted in FIG. 11;

FIG. 13 is a view similar to FIG. 11 of a further modification of the ornament depicted therein and featuring means for automatically animating rotary structure thereof by currents of heated air;

FIG. 13a is an enlarged detailed view of rotary structure of the ornament depicted in FIG. 13; and FIG. 14 is an elevational view similar to FIG. 11 of a further modified form of the ornament shown therein.

Referring to the drawings, in which like numerals identify similar parts throughout, it will be seen from FIGS. 1 and 2 that a free rolling toy ball form of the device may include a globular or spherical hollow casing 20 of light-transmitting or transparent material, such as a clear or tinted plastic. Within the casing 20 are fixed to the curved inner surface thereof at diametrically opposite points a pair of hollow sleeves 21 in opposed alignment. A primary reflector in the form of a rotary plate member 22 is pivotally mounted in the ball casing 20 by means of a pair of pins 23 (see FIG. 2) extending from the periphery thereof at diametrically opposite points with each pin being rotatably received in one of the fixed sleeves 21, so that semi-circular sections of this disk may swing back and forth about a diameter extending between these pivot points. Centrally of the disk a pivot pin 24 extends transversely therethrough, and may be rotatable with respect thereto or relative to structure supported thereby. The annular marginal zone of each side face 25 and 125 of the primary reflector pivoted disk 22, which zone occupies substantially all of the area of each circular side face radially outward of the pivot pin 24, is subdivided into areas or sectors 26, 27, 28 and 29 which preferably are colored different colors such as, for example, red, blue, green and yellow.

The secondary reflector of the toy ball embodiment of FIGS. 1 and 2 may be in the form of a pair of obliquely arranged and opposed reflector means 30 and 130 located on opposite sides of a generally bisecting plane defined by the primary reflector disk 22 in the pivotal suspension of the latter by the pivot sleeves 21. As will be understood from FIGS. 1 and 2 each of these pair of reflector means or units 30 and 130 is in the form of a concave mirror having an interior reflective surface 31 and of a shape similar to a quarter section of a hollow globe, thus being defined by a pair of top and side curved edges 32 and 33 disposed in intersecting planes with these edges meeting in a pair of laterally spaced terminal portions 34 and 35. Transverse bridging means in the form of a suspending rocker bar 36 has its opposite ends fixed to the mirror terminal portions 34 and 35 of each of the pair of reflector units 30 and 130, and the medial portion of each of these bridging bars is provided with a hole in which is received one end of the pivot pin 24. In this fashion, each of the concave mirrors 30 is pivotally suspended from the center of the primary reflector disk 22 for pendulous swing thereat due to its weight, and these two reflector mirrors together constitute a composite cupped or dished reflective structure serving as the secondary reflector. Since the pair of concave mirrors 30 and 130 are mounted on opposite sides of the annular marginal zone of the primary reflector disk 22, with the latter being rotatable in the slot intervening their opposed edges 33, one may observe the color of each sector of the latter as it is interposed therebetween if one looks down through the transparent casing ball 20 into these mirrors.

In order to understand the operation and animation of the toy ball depicted in FIGS. 1 and 2, let it be assumed that the sectors of the opposite side faces 25 and 125 of the primary reflector disk 22 carry matching colors. For example, sectors 26 on opposite side faces of the disk 22 may be colored red. Light rays incident upon the red sectors 26 will be reflected in the reflective inner surfaces 31 of the two concave mirrors 30 and 130, so that when these rays are reflected to an observer's eyes as he looks down into the dished secondary reflective structure he has the visual impression that this composite secondary reflector is red. If he rolls the ball or spherical casing 20 across the floor in a diametrical plane inclusive of the diametrical pivots, afforded by pivot sleeves 21 and pins 23, he will cause the primary reflector disk 22 to rotate therewith in the vertical bisecting plane. Since the concave mirrors 30 and 130 are pivotally supported by the transverse pin 24 to the center of the primary reflector disk 22 they will continue to hang in pendulous orientation with the disk rotating therebetween. This will cause a succeeding area or sector of each side 25 and 125 of disk 22, such as 27 colored blue, to be brought to reflective position opposite one of the concave mirrors 30 and 130, so that the latter together serve as the secondary reflector which will appear now to be blue to the observer as he looks down into the composite cupped or dished secondary reflector assembly. In this fashion, the visual effect to the observer produced by the rolling ball 20 will appear to be a change in the color of the ball successively from one to the next succeeding color of the four colors carried by opposite side faces 25 and 125 of the primary reflector disk 22. Thus, the ball 20 may appear in rolling to change successively from red to blue to green to yellow, and then to repeat successively these color changes.

Concavity of the mirror units 30 and 130 will cause them to appear to be almost wholly of the color of any one of the colored sectors 26 to 29 incl. when opposed thereto even though this sector does not extend angularly the full width of the opposed mirror unit. If the ball 20 happens to be rotated along an annular zone which does not include the diametrically opposed pivot sleeves 21 various visual color effects and changes will be provided and the effects of the pendulous weights in the form of the suspended concave mirrors 30 and 130 will tend to cause the rolling ball to have some transverse or oblique rotational movement gradually bringing the roll thereof to a zone encompassing the pivot sleeves 21, so that the primary reflector disk 22 will be rearranged in a stable vertical plane to give the visual effect previously explained.

It will be understood from FIGS. 3 and 4 that the pair of reflector means which together constitute the composite cupped secondary reflective structure need not be in the form of sections of a curvilinearly dished assembly. Each of the pair of reflector means may be provided with the required angularly related reflective surfaces by making it up from a plurality of plane reflective plates obliquely arranged relative to each other and also with respect to the adjacent side face of the primary reflector disk. As therein shown, the primary reflector (122 in FIG. 3 and 22 in FIG. 4) is also in the form of a disk pivotally supported within the spherical transparent shell 20 by the diametrically opposed pivot sleeves 21. Each of the primary reflector disks 122 and 22 supports medially thereof a through pivot pin 124, similar to that at 24 in FIGS. 1 and 2. Opposite ends of the pivot pin 124 support rocker or hanger bars (136 in FIG. 3 and 236 in FIG. 4). Each of the hanger bars 136 or 236 pendulously supports one of the pair of reflector means 230 and 330, which together constitute the composite cupped secondary reflective structure.

It will be seen from FIGS. 3 and 4 that each of the reflector means 230 and 330 is formed from a pair of plane reflective plates 40 and 41 arranged obliquely with respect to each other at an angle ($\alpha$) and juxtaposed along a line of meeting 42. Each of the hanger bars 136 and 236 support one of these reflector means 130 alongside one face of the primary reflector disk 122 or 22 in oblique relative arrangement, such as by arranging the line of meeting 42 with respect to the adjacent side face of the reflector disk at an angle ($\beta$). Consequently, each of the reflector means 230 and 330 will be the optical equivalent of one of the curvilinear reflector means 30 and 130 of the FIGS. 1 and 2 embodiment. The angles ($\alpha$) and ($\beta$) may be within wide ranges; for example ($\alpha$) may be of the order of about 90° to 150° and ($\beta$) may be of the order of about 45° to 75°, but operative forms may employ these angles in either lesser or greater angular values. It is to be understood that each of these reflector means 230 and 330 may be made up of a larger number of flat plates arranged obliquely relative to each other and with the resulting structure being obliquely arranged with respect to the opposed side face of the primary reflector disk 22 or 122. They will provide a visual reflective effect similar to that given by the curvilinear units 30 and 130.

FIG. 3 illustrates that the opposite side faces of the reflector disk 122 may bear patterned areas either in lieu of or in supplement to colored areas or sectors, such patterned designs being illustrated, by way of example, at 43. While the patterned designs 43 on one side face of the reflector disk 122 may be like those on the opposite side face and similarly arranged they may differ to give different reflective effects in the opposite reflector means 230 and 330 simultaneously.

The action of the toy ball embodiments of FIGS. 3 and 4 in operation will be similar to that produced by the FIGS. 1 and 2 embodiment.

FIGS. 5 and 6 illustrate a toy wheeled vehicle or cart embodiment of the present invention. The wheeled vehicle 45 of FIGS. 5 and 6 may include a bed or frame member 46, which may be a circular block. Hangers 47, fixed to the underside of the bed member 46, mount to the latter and therebeneath a transverse rotary axle 48 which carries fixedly on each end thereof a wheel 49 for transportable support of the bed member 46 across a surface, such as a floor, diagrammatically indicated at 50 in FIG. 6. Medially the axle 48 has fixed thereon a drive roller 51.

If desired, the cart embodiment of FIGS. 5 and 6 may include an inverted dome-shaped housing 120 of light-transmitting material, such as transparent plastic, mounted upon the bed member 46. Within the housing 120 are fixedly mounted a pair of laterally spaced blocks 52 and 152 superposed on the bed member 46. The fixed blocks 52 and 152 respectively support the curvilinear reflector units 430 and 530 with opposed inner edges 33 thereof spaced laterally to provide an intervening slot. Blocks 52 and 152 also support a transverse pin 224 to serve as a shaft for the primary reflector disk 22 having a sector thereof located in the intervening slot. A lower section of the primary reflector disk 22 extends down through a slot 53 in the bed member 46, so that the circumferential edge 54 of this disk frictionally engages the drive roller 51.

Any suitable means may be provided for holding the wheeled toy bed member 46 in a generally horizontal position for wheeled transport over the supporting surface 50, such as a handle 55 fixed to the bed member. The handle 55 may carry any suitable manually engageable means such as a cross bar (not shown) at its far free end for grasp by a child's hands so that he may push the wheeled toy forward.

In use of the wheeled toy embodiment of FIGS. 5 and 6 when one pushes the device over a horizontal surface by means of the handle 55 the rotating wheels 49 will rotate therewith the axle 48 so as to turn the drive roller 51. Consequently, the peripheral edge 54 of the primary reflector disk 22 will be driven to rotate the circular marginal zone of the disk between the pair of the curvilinear reflector units 430 and 530. As a result, images of the opposite side faces of the disk 22 may be observed through the transparent dome 120 in the concave faces of the reflector units 430 and 530, and if these faces bear successive areas of different colors the cupped secondary reflector, comprising concave mirror units 430 and 530, will reflect to the operator's eyes images thereof which will progressively change as the wheeled toy is pushed forward. This will appear to cause the transparent dome 120 intriguingly to change color.

A simplified version of the wheeled toy is illustrated in FIG. 7, wherein the primary reflector disk 222 serves as the transporting wheel. This modification is generally similar to a wheelbarrow structure. A transverse axle 324 through the medial portion of the dual purpose primary reflector disk 222 supports a pair of bracket arms 56 on opposite sides thereof, with the upper end over each of these arms supporting one of a pair of curvilinear secondary reflector units 630 and 730 in opposed relation to opposite side faces of the circular marginal zone of this disk. A handle 155 may have a bifurcated end with the arms thereof disposed against outside faces of the bracket arms 56, and respectively fixed thereto. The outer free end of the handle 155 may carry a transverse hand grasp or bar 57, so that when the latter is held in one's hands the vehicle may be wheeled across the floor to rotate the primary reflector 222. As a result, opposite side faces of the primary reflector disk 222 are rotated between the secondary curvilinear reflector units 630 and 730, so that images thereof may be observed in the latter with progressive visual change during the wheeled transport.

The embodiment of FIG. 8 is in the form of a device similar to a child's rattle. The housing 220 is spherical and transparent and carries fixed therein a pair of curvilinear secondary reflector or mirror units 830 and 930. The latter may be provided as separate units but, if desired, may be formed by mirroring or silvering quarter sections of the interior surface of the spherical housing 220. When the secondary reflector units 830 and 930 are provided as separate elements each may carry a transverse bar 336 which medially supports an end of a shaft pin 424. The shaft pin 424 rotatably supports a primary reflector disk 322, with a sector thereof disposed in a slot 58 intervening opposed inner edges of the reflector units 830 and 930. In the event that these opposed curvilinear reflector units 830 and 930 are provided as mirrored inner surfaces of the spherical housing 220 the ends of the pivot pin 424 will be extended to be supported at diametrically opposite points by the spherical housing.

The device of FIG. 8 includes a handle 59 fixed to the spherical housing 220, so that the latter may be swung thereby in an action similar to that characteristic of a hand rattle. At a point radially outward of the pivot pin 424 the primary reflector disk 322 may be provided with a weighting mass 60, so that this side of the disk will tend to depend in a pendulous manner.

Whenever the "rattle" embodiment of FIG. 8 is swung or shaken the weight 60 will cause the primary reflector disk 322 to swing erratically back and forth for rotational movement of sectors of the marginal zone of the disk between the opposed pair of reflector units 830 and 930. With opposite side faces of the primary reflector 322 carrying successive areas or sectors of different colors the reflected images appearing in the opposed pair of secondary reflector units 830 and 930 may be made to appear to change color with this swinging action.

It may be desired to employ principles of the present invention for decorative purposes or to provide pleasing changing ornamental effects in displays and the like. For example, a surface may support or have set thereinto a series of the cupped secondary reflective structures, such as those indicated at 65 in FIG. 9. Each dished mirror 65 is provided with a medial hole 158, which may be an elongated slot which defines the pair of opposed reflector units 1030 and 1130 from each other. In this embodiment the primary reflector unit 422 may be in the form of an elongated strip having sections disposed in the slots 158 of the secondary reflector units 65 for longitudinal motion or reciprocation therethrough. Means may be provided for moving the primary reflector strip 422 longitudinally back and forth in the slots 158 for automatic operation as may be desirable in a display. For example, a driven crank member or disk 66 may be provided so that an eccentric crank pin 67 thereof will reciprocate the strip 422 by means of a connecting rod or strap 68.

Sections or areas of opposite side faces of the primary reflector strip 422 of the FIG. 9 embodiment may be defined from each other and provided with different colors so as to provide changing colored images in the inner reflective surfaces of the secondary reflector units 65 during the reciprocation of the strip. If each of these areas extends the maximum longitudinal dimension of each of the slots 158 and the secondary reflectors 65 are spaced longitudinally sufficiently to intervene the far top end of the slot of one of the secondary reflector units and the opposed near top end of the slot of the next secondary reflector unit with a space equal thereto, and these are given different colors, the mirrored images in the secondary reflector units may appear to change from one color to the next and back again in the reciprocation of the primary reflector strip 422. In the latter event, the stroke of the primary reflector strip 422 may be a multiple of this spacing by suitable design of the operating mechanism, such as the crank device illustrated in FIG. 9. However, due to the convergence of light rays by concave surfaces the inner faces of the cupped secondary reflector units 65 may be made to appear to be almost wholly of a single color even though the area of the opposed face of the primary reflector of a single color is of a lesser length than the diametric dimension of the slotted concave mirror.

As is illustrated in FIG. 10 embodiments of the device which may employ secondary reflector units similar to those shown at 65 in FIG. 9 may each be associated with a primary reflector means, such as a strip 522, which is reciprocated through the hole or slot 158 in and out rather than transversely. In a variation of the FIG. 10 structure one may provide the medial hole in the dished secondary reflector in the form of a localized aperture located centrally or axially thereof and through which the primary reflector may be advanced and withdrawn or reciprocated. Such primary reflector may thus be a rod of various cross-sectional shapes or an elongated cylindrical element extending through the central hole or aperture, and the latter may be of complementary shape. The rod may have succeeding circumambient sections of its outside surface provided with different colors so that when any particular one of these sections is located within the dished secondary reflector the inside mirror surface of the latter reflects this particular color to make the secondary reflector appear to be of this color, and to allow change in the color appearance thereof with movement of the rod longitudinally in the central hole.

The present invention may be embodied in various types of hanging ornaments, such as those suitable for decorating trees. Various forms thereof are illustrated in FIGS. 11 to 14 incl.

In the embodiment of FIG. 11, casing 320 is preferably in the form of a transparent globe or ball provided with suitable suspending means 70. A hemispherical section of the inner surface of the ball 320 may be mirrored or coated with reflective material to provide the secondary reflective structure 165. Medially of the dished or cupped secondary reflector 165 the ball 320 may be provided with an elongated vertical slot 258. The primary reflector 622 may be in the form of a plate, the major portion of which is circular with a minor portion of the edge set back at 71 by a curved notch, and broadly may be considered a disk with a distorted circumferential section. The primary reflector plate 622 is loosely mounted for motion in its plane within the secondary reflector 165, and may carry a projection 72 for manual manipulation. For example, the projection 72 may be in the form of a tab or finger extending out through the slot 258 and provided with a transverse pin or washer 73 to ride against the outer surface of the ball 320, so as to hold the tab 72 in the slot 258.

The ornament of FIG. 11 may be caused to appear to be of a different color if sectors of the primary reflector disk 622 are of different colors and this disk is set in different positions by manipulation of the tab 72. For example, a medial sector 126 may be red and flanking sectors 127 and 129 may respectively be blue and yellow. Both side faces of the primary reflector disk 622 preferably will be similarly colored. Thus, when the tab 72 is set in a medial position the red sectors 126 on opposite sides of the primary reflector disk 622 will cause the inner faces of the curvilinear secondary reflector sectors of the secondary reflector 165 to appear to be red. If the primary reflector disk 622 is rotated to another position so as to oppose the blue sectors 127 thereof to the inner faces of the curvilinear reflector sections the latter will appear to be blue, and the color may be changed by moving the disk back in the opposite direction by the tab 72 either to the red of the intermediate sectors 126 or the terminal yellow of the end sectors 129 on the opposite side of the latter.

The ornament of FIG. 12 is a variation of the structure proposed in FIG. 11 with the spherical ball 420 provided with a suspending member 170 and having a vertical slot on the back side thereof which may be similar to that at 258 of FIG. 11. Such slot 258 may, for example, extend from the point 258-1 to the point 258-2. A primary reflector disk 722 may be pivotally mounted by transverse pivot pin 524 supported within the ball 420 in the near vicinity of the slot 258 rotatably to support the central area of the primary reflector disk 722, with a minor sector of the latter, indicated at 74, disposed within the ball. For example, the minor sector 74 may extend through about 120°. This leaves a major sector 75 extending beyond the ball and its slot 258 and exterior therefrom so that it may be readily grasped, with this sector extending, for example, through about 240°. Consequently, each side face of the disk 722 may be subdivided into three substantially equal sections 226, 227 and 228 and each may be of a different color.

The interior of the spherical ball 420 may be mirrored on opposite sides of the slot 258 to provide a dished secondary reflective structure 265 to define an opposed pair of reflector means similar to those provided at 1030 and 1130 in FIG. 9.

In the use of the suspended ornament of FIG. 12, one may grasp the exposed sector 75 of the primary reflector disk 722 and rotate it until one of its three pairs of colored sections, such as 226 which may be red, is located between the opposed pair of reflector means 1030 and 1130 of the dished reflector 265. When this ornament is suspended so that the projecting sector 75 of the primary reflector disk 722 extends backwardly into the tree branches so as to be partially or wholly hidden the opposite side will be exposed to view so that one may look into the secondary reflector 265. This ornament will then appear to be red. If the disk sector 75 is manually engaged and the disk 722 rotated to bring one of the other sections 227 or 228 to the intervening position of the section 226, the color of the ornament will apparently be changed to that of the intervening section.

The projecting sector 75 of ornament 420 also provides means tending to keep the secondary reflector 265 facing outward since it may form a fin or tail tending to be engaged by inner branches to prevent the ball from rotating on its suspension stem 170. Also, the coloring of the exposed sections 227 and 228 which may be viewed from either side back beyond the spherical housing or ball 420 will not interfere with the desired ornamental effect since if they can be observed from the sides they will constitute pleasing areas of different or contrasting colors. Further, the minor sector 74 provides a set-back of the disk structure 722 so as to attain an advantage similar to that provided by the notch 71 of the primary reflector 622 of FIG. 11, permitting one to look into the far concave mirror from an appreciable angle to a position directly in front in the plane of the primary reflector disk 722.

FIG. 13 illustrates a modified form of the ornaments depicted in FIGS. 11 and 12. In this form the primary reflector disk 822 is located wholly within the spherical housing 520 and is rotatably supported therein by a diametrically-extending pivot pin or shaft 624 having its ends fixedly supported by the housing. The secondary reflector 365 is provided by silvering a section of the interior surface of the transparent housing 520, so that sections of the marginal zone of the primary reflector disk 822 will be rotatably disposed therein substantially on a bisecting plane. The ornament of FIG. 13 may be automatically animated such as by providing its periphery with an annular series of oblique blades 76. If desired, these may be formed by radially slitting at closely spaced points this annular zone and then bending or twisting the resulting tabs to define the blades 76. If an inlet hole 77 and an outlet hole 78 are provided in the wall of the ball 520 in substantially vertical alignment, to define a path therebetween intercepted by the annular series of blades 76, a current of air rising from the inlet to the outlet will cause the primary reflector disk 822 to revolve. This current of air may be created by a suitable heat source, such as a suitably shielded electric light bulb diagrammatically indicated at 79, so that air heated thereby will enter the inlet hole 77 and exit at the outlet hole 78 rotatably to drive the primary reflector disk 822.

Suspension of the ornament 520 illustrated in FIG. 13 may be changed to suspend its spherical casing from a point aligned with the axis of the shaft 624. As a result, the primary reflector 822 would be arranged substantially in a horizontal plane. In such case the inlet and outlet holes 77 and 78 would be located on opposite sides of the vaned disk reflector 822 so that air currents would rise through between the vanes 76 to spin this disk. Also, the annular zone of vanes 76 may be wider and even extend from the peripheral edge to the central shaft 624, in which case the successive sectors shown in FIG. 13 may be separated by radial slits and these sectors then warped slightly to provide large vanes for rotary drive of the disk. Each such sectoral vane may have its opposite side faces of like color, with the color of each vane differing from that of the preceding and succeeding vanes for the desired color change observed in the dished secondary reflector 365.

The ornament of FIG. 14 also locates the primary reflector plate 922 wholly within the housing ball 620. A section of the inner surface of the ball 620 may be mirrored to provide the dished secondary reflector 465 in a form similar to that at 365 in FIG. 13. The primary reflector plate 922 is rotatably supported by a transverse shaft 724 having one end extending through the side wall of the ball 620 and fitted exteriorly with a finger-engageable knob 80. If the mount of the shaft 724 through the housing wall has appreciable friction the shaft will remain temporarily in any position set by turning of the knob 80. The plate 922 may be in the form of a disk having the circumferential edge notched back at 71-1, 71-2 and 71-3 similar to the notching back at 71 of the primary reflector plate 622 of the FIG. 11 ornament. The notching back at 71-1, 71-2 and 71-3 of the primary reflector 922 is provided for a like purpose, i.e., to permit one to look across the front edge of a sector thereof from an appreciable oblique angle for observation in both sides of the dished secondary reflector 465 of images of opposite faces of a diametrically opposed sector located within the secondary reflector. Apparent color change is attained by setting the primary reflector plate 922 in any one of three positions, so that, for example, section 226 of one color is located within the dished secondary reflector 465 in bisecting orientation (as is illustrated in FIG. 14), and then sections 227 and 228 are alternately substituted therefor. It will be understood that a greater number of colors may be applied to the primary reflector plate 922 and the opposite side faces thereof correspondingly provided with an equal number of sections of differing colors, with the circumferential edge of the plate opposite any particular one of these sections being notched back for greater angle of view into the secondary reflector 465.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A changeable light reflective device comprising
   (a) a composite cupped reflective structure into which one looks for visual reflection effects and alterations thereof including
   (b) a pair of obliquely arranged and opposed reflector means located on opposite sides of a generally bisecting plane,
   (c) a visual change member movably mounted in said plane for translation therealong having at least a zone thereof extending into said cupped reflective structure with faces of said zone successively bearing visually differing areas to be reflected in said pair of opposed reflector means, and (d) means to manipulate said plate member for translating said zone thereof substantially along said plane to locate different ones of said areas alternately in reflective relation to one of said opposed reflector means.

2. A changeable light reflective device comprising, in combination,
   (a) a pair of obliquely arranged and opposed reflector means each having angularly related reflective surfaces with said means together constituting a composite cupped reflective structure into which one looks for visual reflection effects and alterations thereof,
   (b) said pair of reflector means having at least portions separated laterally by an intervening slot,
   (c) a visual change movable plate member having a marginal zone extending into said slot for reflecting light rays from opposite side faces into said pair of reflector means flanking the latter for simultaneous observation,
   (d) the opposite side faces of said sheet member successively bearing visually differing areas, and
   (e) means to manipulate said plate member for translating said marginal zone through the slot for locating different sections of said zone alternately in reflective relation to said composite cupped reflective structure.

3. The device as defined in claim 2 characterized by said composite cupped reflective structure having its pair of opposed reflector means each in the form of a concave mirror.

4. The device as defined in claim 3 characterized by said composite cupped reflective structure being curvilinearly dished.

5. The device as defined in claim 4 characterized by each of said opposed reflector means constituting approximately a one half portion of said dished reflective structure with said slot laterally separating opposed edges of said portions thereof.

6. The device as defined in claim 2 characterized by said plate member being in the form of a pivotally mounted structure.

7. The device as defined in claim 6 characterized by said pivotally mounted plate structure being a disk, and means pivotally supporting said disk at diametrically opposite points on its periphery for swing back and forth of semicircular sections thereof about a diameter extending between said points with said pair of opposed reflector means being pivotally mounted to the central portion of said disk on opposite sides of the latter for pendulous suspension from said disk and to swing therewith.

8. The device as defined in claim 7 characterized by said disk supporting means being in the form of a pair of opposed and aligned pivots, and a hollow light-transmitting globular housing encasing said reflective structure and disk with said pivots fixedly mounted therein at diametrically opposite points.

9. The device as defined in claim 8 characterized by said globular housing being in the form of a free rolling ball with each of said reflector means being in the form of a concave mirror having a pair of curved edges disposed in intersecting planes with said edges meeting in a pair of spaced terminal portions, transverse means bridging across between said pair of terminal portions of each of said concave mirrors, and pivot means pivotally supporting the medial portion of each of said bridging means to the central portion of said disk as the pendulous suspension of said mirrors.

10. The device as defined in claim 6 characterized by embodiment thereof in a small vehicle structure to be manually wheeled across a supporting surface, said pivotally mounted plate structure being in the form of a rotatable disk having the marginal zone thereof located annularly thereabout, and means pivotally supporting the central portion of said disk in said vehicle structure in a manner that when the latter is so wheeled said disk is rotatably driven to rotate the annular zone of the latter between said opposed reflector means.

11. The device as defined in claim 10 characterized by said reflector means being fixedly supported on said vehicle structure on opposite sides of said disk.

12. The device as defined in claim 11 characterized by said pivoted disk constituting a wheel of said vehicle structure to be rotated by frictional engagement of the supporting surface when said vehicle is wheeled across said surface.

13. The device as defined in claim 11 characterized by said vehicle structure including transporting wheel means, and means drivably connecting said wheel means to said disk for rotating the latter.

14. The device as defined in claim 13 characterized by each of said pair of reflector means being in the form of a concave mirror with said mirrors facing opposite sides of the annular zone of said disk.

15. The device as defined in claim 14 characterized by said concave mirrors cooperatively providing said composite reflective structure in the form of a curvilinearly dished reflector.

16. The device as defined in claim 2 characterized by said movable plate member being an elongated flat strip translatable back and forth through the slot between said pair of opposed reflector means.

17. The device as defined in claim 16 characterized by means to reciprocate said strip back and forth through said slot.

18. A changeable light reflective device comprising, in combination,
   (a) a globular hollow casing having a light transmitting front section and a back section provided with a concave mirrored surface,
   (b) a rotatable disk having at least an intervening sector thereof mounted in bisecting position between opposed sides of said concave mirrored surface,
   (c) transverse pivot means supported by said casing and rotatably supporting the central portion of said disk in such position
   (d) with opposed sides of said sector and adjacent sectors provided with visually differing areas for reflection in opposed faces of the mirrored surface for change in visual appearance of the latter when the disk is rotated, and
   (e) means to effect rotation of said disk.

19. The device as defined in claim 18 characterized by means to support said casing at a point opposite the edge of said disk with said means to effect disk rotation being weight means carried by said disk eccentric of its pivoted central portion pendulously to effect swing of said disk back and forth in response to swinging motion of said casing.

20. The device as defined in claim 18 characterized by said means to rotate said disk being manually engageable exterior of said casing to turn said disk for substituting one of said sectors of the latter for another at the bisecting position in a set condition.

21. The device as defined in claim 18 characterized by said disk sector having the front edge thereof set back in a direction toward the interior of said concave mirrored surface to permit observation into the opposite sides of said mirrored surface from points located appreciable distances to opposite sides of a position in which one looks directly into said mirrored surface along lines substantially parallel to opposite sides of said disk.

22. A changeable light reflective device comprising
   (a) a cupped reflective structure having a secondary interior reflective surface into which one looks for visual reflection effects and alterations thereof,
   (b) said cupped reflective structure being provided with a medial hole extending therethrough,
   (c) a visual change primary reflective member movably mounted through the hole for translation in a certain direction therethrough and having
(d) external surface areas arranged in opposed relation to areas of the secondary interior reflective surface for observation in the latter of images of the former, with such areas differing in the direction of translation for change of these reflected images, and
(e) means to manipulate said primary reflective member in the certain direction of translation.

References Cited in the file of this patent

UNITED STATES PATENTS

| | | |
|---|---|---|
| 2,115,986 | Da Costa | May 3, 1938 |
| 2,496,603 | Schwanengel | Feb. 7, 1950 |
| 2,606,373 | Lambert | Aug. 12, 1952 |
| 2,937,475 | Crawford | May 24, 1960 |
| 3,058,261 | Lakin | Oct. 16, 1962 |